United States Patent [19]
Tye, III

[11] Patent Number: 4,895,086
[45] Date of Patent: Jan. 23, 1990

[54] PARALLEL LINKAGE PLANTER CARRIER

[76] Inventor: John M. Tye, III, P.O. Box 218, Lockney, Tex. 79241

[21] Appl. No.: 680,301

[22] Filed: Dec. 11, 1984

[51] Int. Cl.⁴ ............................................. A01C 5/06
[52] U.S. Cl. .................................... 111/134; 111/926; 111/927
[58] Field of Search .............. 111/85, 84, 62, 66, 111/79–81, 6, 7, 88, 69; 172/705, 307, 417, 484, 488, 572, 624.5, 573, 448, 462, 739, 264, 123, 118

[56] References Cited

U.S. PATENT DOCUMENTS

| | | | |
|---|---|---|---|
| 1,411,897 | 4/1922 | Aspinwall | 172/572 |
| 2,774,318 | 12/1956 | Johnson | 111/85 X |
| 2,793,577 | 5/1957 | Paige | 172/307 |
| 2,964,114 | 12/1960 | Meldahl | 172/488 X |
| 2,975,844 | 3/1961 | Oehler et al. | 111/85 X |
| 3,023,718 | 3/1962 | Sorensen et al. | 111/85 |
| 3,450,074 | 6/1969 | Gatzke et al. | 111/7 X |
| 4,030,428 | 6/1977 | Truax | 111/85 |
| 4,208,974 | 6/1980 | Dreyer et al. | 111/85 |
| 4,275,670 | 6/1981 | Dreyer | 111/85 |
| 4,311,104 | 1/1982 | Steilen et al. | 111/85 |
| 4,359,101 | 11/1982 | Gagnon | 172/117 X |
| 4,407,371 | 10/1983 | Hohl | 172/166 X |
| 4,425,857 | 1/1984 | Lienemann et al. | 111/85 |
| 4,461,355 | 7/1984 | Peterson et al. | 111/7 X |
| 4,509,603 | 4/1985 | Adams | 172/624.5 X |
| 4,519,325 | 5/1985 | Miller | 111/85 |

OTHER PUBLICATIONS

DewEze Super Drill 40 Flier, 1982 DEWEZE Mfg., Inc.
Hiniker Company, "Econ-O-Till 3000/3500", Sep. 1983, Hiniker Company, P.O. Box 3407, Mankato, MN 56001.

Primary Examiner—Danton D. DeMille
Attorney, Agent, or Firm—Wendell Coffee

[57] ABSTRACT

A planting unit which includes opening plows, seed chute, and covering devices, which are carried by a four link parallel motion linkage to the tool bar, has a novel spring arrangement. The spring extends from one of the junctions of the linkage to a spring lever mounted at midpoint of one of the links. The spring lever is adjusted about its pivot point by having an adjustment bar extending through an ear and held in place by a pin through one of a selected number of holes. The linkage is connected to a cylindrical tool bar by "U" bolts so that each of many planting units may be adjusted for proper alignment relative to all the other planting units. The cylindrical planter tool bar is journaled to a main tool bar so that all of the planting units upon the planter bar may be adjusted by rotating the cylindrical planter tool bar about its longitudinal axis, making it unnecessary to rotate the entire main tool bar.

5 Claims, 3 Drawing Sheets

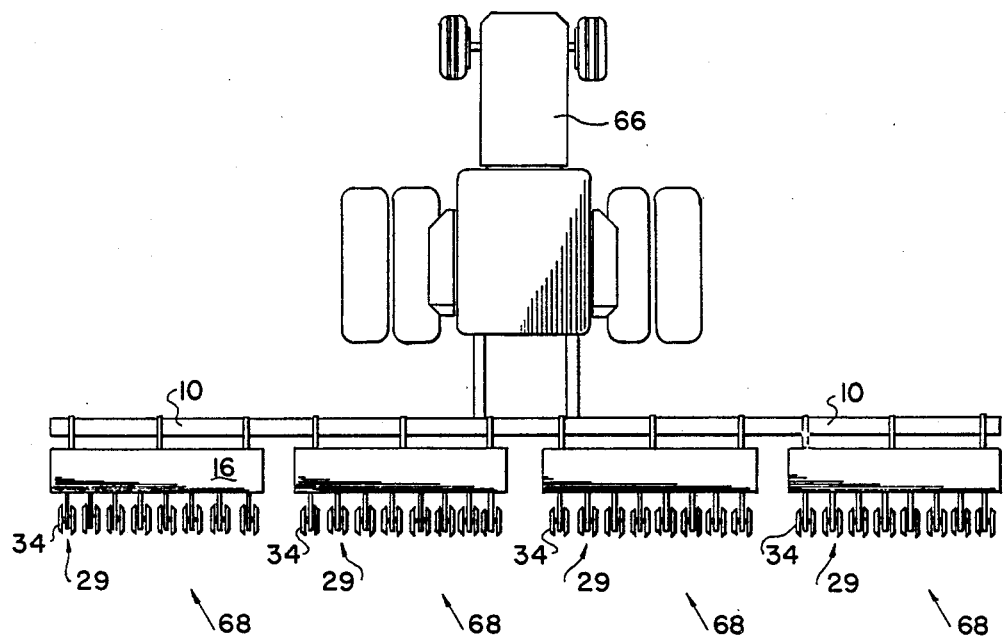
FIG-6
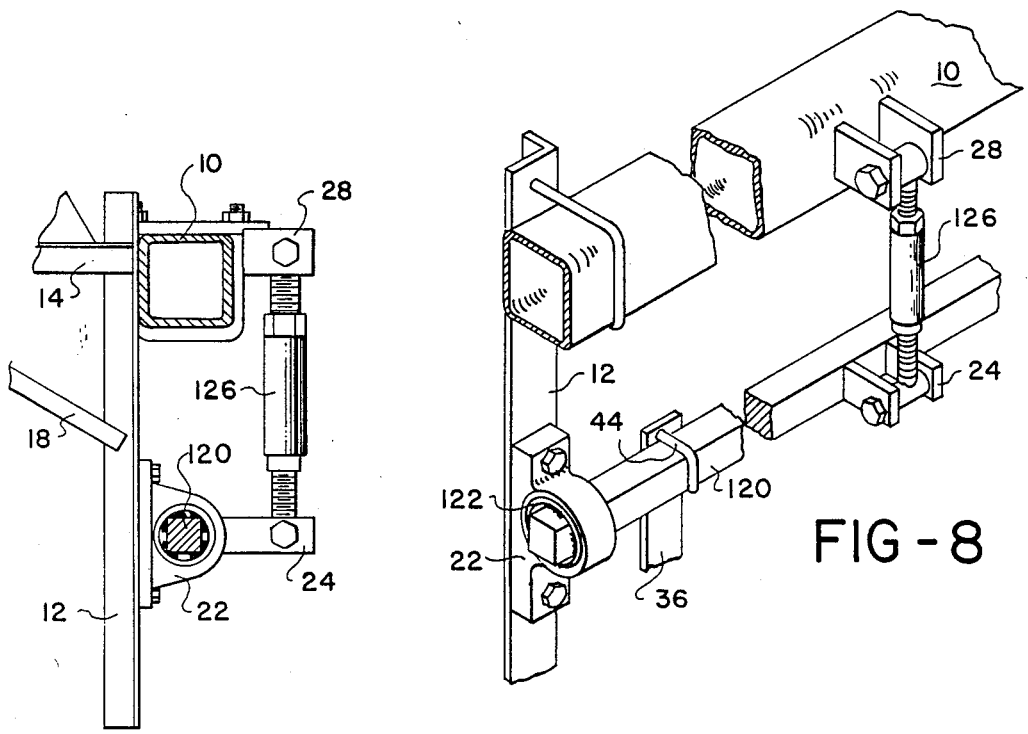
FIG-7
FIG-8

PARALLEL LINKAGE PLANTER CARRIER

BACKGROUND OF THE INVENTION (1) Field of the Invention

This invention relates to planting agricultural crops, and more particularly to attaching the planting units of a drill. (111/85)

(2) Description of the Prior Art

Almost all planters or drills will have an opening device to form a furrow A seed chute will provide means for dropping seed into the furrow. Then, the furrow will be closed, covering the seed with earth. Some will have additional implements. E.g., SCOTT, U.S. Pat. No. 4,432,292 also shows a gauge wheel to regulate the depth of the furrow device; an earth working implement to remove dry dirt from the top of the soil, and a press wheel to press the drilled seed into firm soil. The covering device is in the form of a drag which not only closes the furrow and covers the seed, but also, cultivates the soil which is used to cover the planted seed.

Before this application was filed, the applicant caused a search to be made in the U.S. Patent and Trademark Office.

The following patents were found on that search:

| HENDRIX ET AL. | 4,267,783 |
| FRASE ET AL. | 4,398,478 |
| ROBINSON, JR. ET AL | 4,423,788 |
| LIENEMANN ET AL. | 4,425,857 |

It may be seen that all of these patents show it is old to use a parallel linkage mechanism with planters. Three of them show that it is old to use the parallel linkage mechanism with drills wherein a single planter seed box is used to feed a plurality of planting units. Also, these three (those to International Harvester Co.: namely, FRASE ET AL., ROBINSON, JR. ET AL., and LIENEMANN ET AL.) show that it is old to use a spring within the parallel motion linkage to bias the planting units so that additional forces are exerted on the planting units.

HENDRIX ET AL. and SCOTT show a unit wherein there is a separate seed box for each planting unit. Also these patents appear to disclose a tool bar which is capable of being rotated about its longitudinal axis.

Applicant is aware of an advertizing flier for DewEze Super Drill 40, manufactured by DEWEZE Mfg., Inc., East Highway 160, Harper, Kans. 67058. These units have a width of about 40 feet with over 30 planting units supported by parallel motion linkage. Applicant understands that these units are designed to have the tool bar rotate about its longitudinal axis so that the planting units might have the proper angular orientation to the land being planted.

One of the principle attributes of the parallel linkage planting system is to provide accurate and uniform depth of seed placement in varying soil and topographical conditions. Parallel link openers have long been used commercially on planters where there are just a few of the units to be adjusted. However, parallel link openers have lacked wide spread commercial acceptance on drills because of the large number of individual planting units found on drills and the corresponding difficulty in making adjustments on all of these units.

SUMMARY OF THE INVENTION (1) New Functions and Surprising Results

This invention allows the use of the highly accurate parallel arm opener for seed placement while solving the problem of time involved for adjustment by making only one adjustment at the turnbuckle or hydraulic cylinder for each planter tool bar.

I have invented a planter, and more particularly a drill, whereby a cylindrical planter tool bar is mounted parallel to the main tool bar. The cylindrical planter tool bar is journaled for rotation to the main tool bar. Parallel motion linkages are attached to the tool bar by clamps. In the manufacturing of the units, the planter units are placed on a level surface, such as a concrete slab, and clamped to the cylindrical tool bar so that all of the units have the same orientation. The angular position of the cylindrical tool bar is governed by hydraulic cylinder or turnbuckle which extends from the main tool bar support to a lever extending radially from the cylindrical planter tool bar. In this way, I provide for easier manufacturing and assembling techniques, and also for a better angular control by the farmer when operating the equipment. The operator, by use of the hydraulic cylinder, can change the angular position of the tool bar and hence the depth at which the seed is planted during the planting operation, such as might be desired when planting a large field with two or more soil types encountered in each planter pass.

Although it simplifies manufacture for the individual parallel link units to be attached to a cylindrical tool oar, that often the farmers will be involved in and subject the units to rough usage. In rough usage, it is difficult to maintain the proper angular adjustment of the units. Therefore, in certain commercial practices, it is preferred to attach the parallel linkage to a square tool bar. Cylindrical sections along the square tool bar allow the tool bar may be angularly adjusted by the hydraulic cylinder or turnbuckle.

Furthermore, I have greatly simplified the use of springs by which the planting unit is biased Normally, with the unit according to my design, it will be desirable to use a spring stress or bias the planting unit upward; i.e., reduce the weight of the planting unit bearing against the ground. A spring extends from the front lower corner of the four link parallel linkage to a spring lever which is pivoted about midpoint of the upper horizontal link. The position of the lever, and thus the tension upon the spring, is adjusted by the angular adjustment of the lever. This is accomplished by having an adjustment bar extend through an ear with it retained in place by a pin through one of the plurality of holes in the bar.

Therefore, it may be seen that I have made the unit easier to manufacture and far easier to adjust both as to angular orientation and as to the pressure of the planting units against the soil.

(2) Objects of this Invention

An Object of this invention is to plant seed in the soil.

Further objects are to achieve the above with a device that is sturdy, compact, durable, lightweight, simple, safe, efficient, versatile, ecologically compatible, energy conserving and reliable, yet inexpensive and easy to manufacture, adjust operate and maintain.

The specific nature of the invention, as well as other objects, uses, and advantages thereof, will clearly appear from the following description and from the accompanying drawing, the different views of which are not scale drawings

BRIEF DESCRIPTION OF THE DRAWINGS

FIG. 6 is a top plan view, somewhat schematic, representing a tractor with a total of 32 planting units attached thereto FIG. 7 is a side elevational view showing a second embodiment of a planter tool bar and adjustment means therefore.

FIG. 8 is a perspective view of the embodiment shown in FIG. 7.

DESCRIPTION OF THE PREFERRED EMBODIMENT

Figure 1:
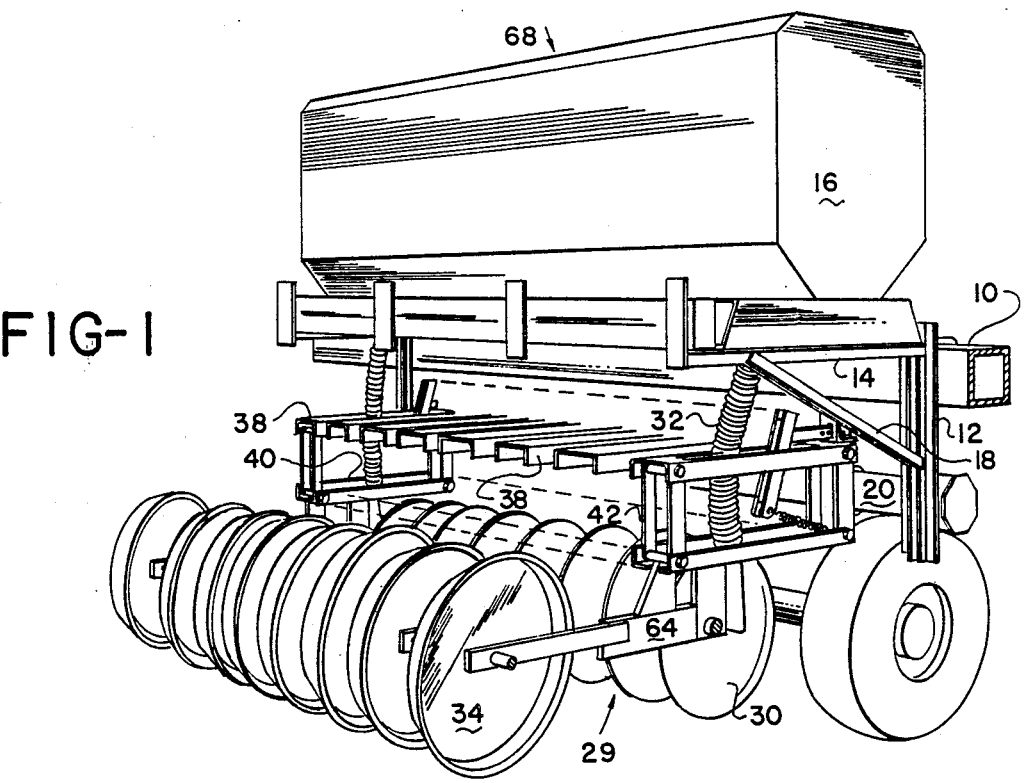
FIG. 1 is a perspective view of a drill section according to my invention, with parts omitted for clarity.

FIG. 6 of the drawing shows a typical installation. Agricultural tractor 66 is shown attached to the main tool bar 10 which is a portion of four units 68. Each of the units will have a single seed box 16. As illustrated, each unit will have eight planting units 29. Therefore, there will be a total of 32 planting units. If the planting units were limited to a relatively small number, such as six or eight, as in the situation with large seeds such a cotton seed, then each planting unit would include its o n box. Furthermore, with only six or eight planting units, commercially acceptable models are produced wherein each planting unit is independently adjustable.

However, with drills wherein the rows are much closer and the seed are much smaller, and several planting units 29 are feed from Single seed box 16, it is not commercially acceptable to have each unit individually adjustable.

Referring to FIGS. 1 through 5, each unit 68 has a portion of main tool bar 10 which would extend the full width of the unit 68. It will be understood, although not shown in FIGS. 1 through 5, that tool bar 10 would have hitch means for attaching it to a tractor whereby it might be drawn through a field having land to be planted. This hitch is shown schematically in FIG. 6.

A plurality of shanks 12 extend downward from the main tool bar 10. Extending rearwardly of these are beams 14 which support the single seed box 16. The beams 14 are supported by braces 18 which extend from the shanks 12 to the beam 14 as shown.

It will be noted that I describe the seed box as a 1 single seed box. The device is shown having eight planting units 29. I.e., it would form eight furrows and drill seed into each. It would be understood, as discussed above that there could be over 30 planting units attached to a single tractor 66. In such instances, there might be more than one seed box. However, each seed box would serve at least six planting units.

Figure 3:
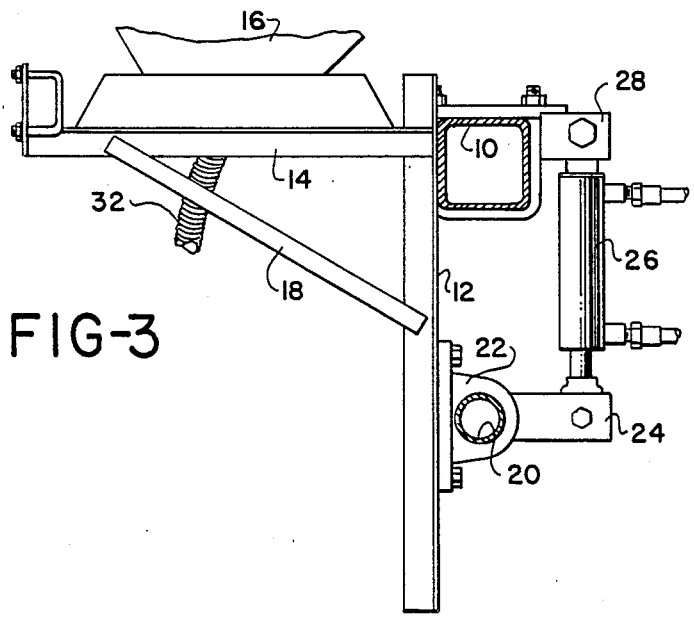
FIG. 3 is a side elevational view showing the planter tool bar journaled to the main tool bar.

Cylindrical planting tool bar 20 is journaled by bearings 22 to the shanks 12, as seen in FIG. 3. The cylindrical planter tool bar 20 is horizontal as is the main tool bar 10. The cylindrical planter tool bar is parallel to the main tool bar. The planter tool bar 20 extends for the total width of the unit 68.

At least one lever 24 is attached to the cylindrical tool bar 20. Hydraulic cylinder 26 attaches at its lower end to the lever 24 and its upper end to ear 28 upon the main tool bar 10. Expansion and contraction of the cylinder 26 is controlled by the operator from a valve controlling hydraulic pressure normally found on modern tractors. The cylinder 26 will adjust the angular positioning of the cylindrical planter tool bar.

A plurality of planting units 29 are illustrated; each planting unit as illustrated has an opening plow 30 which is a furrow means for forming a furrow in the land to be planted. Seed chute 32 extends from a seed metering means on the seed box 16 to the opening plow 30. Seed are dropped through the chute 32 into the furrow.

Wheel 34 forms the dual function of a press wheel and a covering wheel. I.e., it both presses the seed into the furrow and forms a cover means for covering the seed in the furrow.

Figure 2:
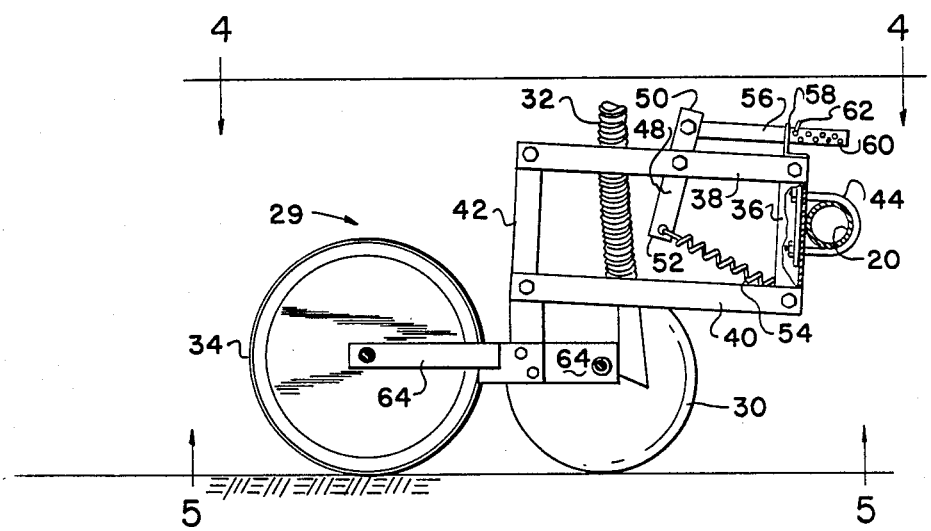
FIG. 2 is a side elevational view thereof, with the planting unit setting on a concrete slab for alignment, with parts omitted for clarity.
Figure 4:
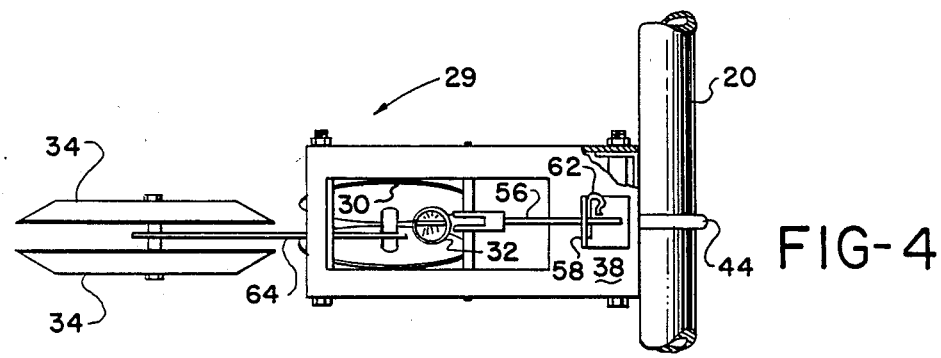
FIG. 4 is a top plan view of one of the planting units, with parts omitted for clarity.
Figure 5:
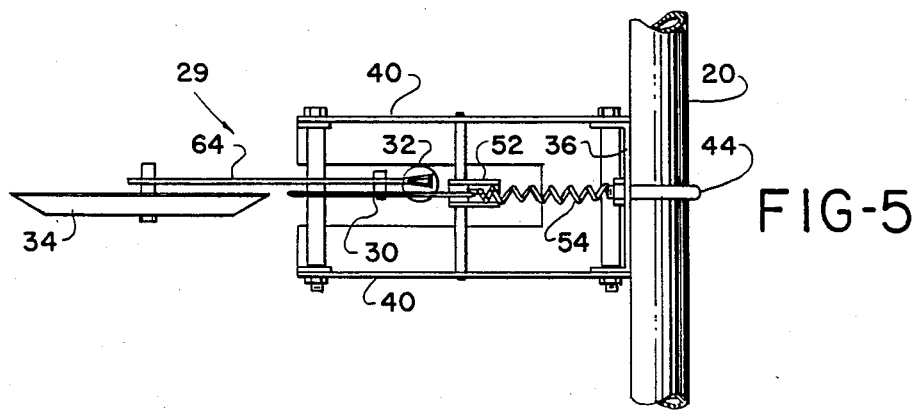
FIG. 5 is a bottom plan view of one of the planting units, with parts omitted for clarity.

FIGS. 1, 2, and 5 show only one wheel 34 and one opening s plow 30. Those skilled in the art will know that there are actually two such units as shown in FIG. 4. However, for clarity, only one has been shown in FIGS. 1, 2, and 5.

Four link parallel motion linkage includes the first link 36, the second link 38, the third link 40, and the forth link 42.

Those skilled in the art will recognize that planting units having furrow means for forming a furrow, a seed chute through which seed may be dropped into the furrow, and a cover means for covering the seeds in the furrow, connected to a tool bar by a four link parallel motion mechanism is old and well known in the art. Further, it is known there may be additional elements on a planting unit such as additional cover means, separate press wheels, gauge wheels, plow means for scraping dry dirt from the land to be planting, or, as shown in other patents, there may be colters to cut the sod in front of the opening of the plow.

FIGS. 7 and 8 show different embodiments in two respects. First, it shows a simpler, less expensive adjustment means for adjusting the angular position of the plow planter tool bar. Instead of using the hydraulic cylinder 26, a turnbuckle 126 is employed. Either the hydraulic cylinder or turnbuckle is an adjustment means for positioning the planter tool bar into angular position and maintaining the planting units in the proper angular orientation to the land being planted. Like the hydraulic cylinder, the turnbuckle 126 extends at its lower end from lever 24 and upper end to ear 28. The turnbuckle will be adjusted by rotating the barrel thereto.

Referring to FIG. 2, the first link 36 is connected to the cylindrical planting tool bar 20 by "U" bolts 44. When the opening plow 30 and the covering wheel 34 of all of the planting units are resting upon a cement slab as shown in FIG. 2, all of the planting units 29 have the same orientation. Then, if the "U" bolts 44 are tightened so that the first link of the parallel motion linkage were securely attached to the planting tool bar 20, they will be fixed in that position. This eliminates concern about precisely manufacturing the units. Otherwise, the various planting units of the plurality of planting units 29 attached to the planting tool bar 20 would not be in the exact same orientation. For this reason the device according to my invention is much easier and simpler to manufacture.

The other embodiment shown in FIGS. 7 and 8 are made where the planting unit will receive rough treatment or rough usage. In extremely rough usage it is difficult to prevent the "U" bolt 44 from slipping or rotating upon the cylindrical planter tool bar 20. Therefore, for such usage, it is preferred that square planter tool bar 120 be used. The adjustment described above may be otherwise provided, e.g., by using shims or wedges between the first link 36 and the square planter tool bar 120. So that the square tool bar 120 may be journaled at s bearings 22 to the shanks 12, it is necessary that cylindrical sleeve 122 be placed over the square planter tool bar 120 at the bearings 22

The first link 36 is pivoted by pivot bolts or junctions to the second link 38 and third link 40. The forth link 42 is attached by pivot bolts at junctions to the second link 38 and third link 40. The first and forth link are parallel or nearly so, and also, the second and third link are parallel or nearly so. Therefore, the forth link 42 will always be parallel to the first link 36 regardless of the elevation of the planting units 29.

If the angular position of the planting tool bar 20 is changed by operation of the hydraulic cylinder 26, it will change the relationship as between the elements of the planting unit 29 and the land being planted. If it is desired that the opening plows 30 run more deeply in respect to the press wheels 34, the first link 36 and forth link 42 are rotated clockwise, as viewed in FIG. 2, which is an extension of the hydraulic cylinder 26. On the other hand, if it is desired that the press wheel 34 press the seed more firmly into the soil and the opening plow 30 to run shallower, the hydraulic cylinder 26 is contracted, rotating the planting tool bar 20 in a counter clockwise direction as viewed in FIG. 2. It will be understood that the operator, by merely moving a valve from his tractor location could achieve these adjustments.

Those skilled in the art understand the same results of rotation of each of the individual planter tool bars 20 or 120 could be achieved by manual extension or contraction of the turnbuckle 126 by rotating the barrel.

It is normally desired to bias the planting unit 29 toward the land. I.e., that considering the first link 36 as being in a fixed position it may be seen that if the second link 38 is pulled downward, as by a spring, that it will cause additional stress to be placed upon the planting unit 29 against the soil. This is done by the prior art However, in the prior art, this is not a simple adjustment I have simplified the adjustment by placing tension lever 48 or spring lever in the linkage. The tension lever will have an upper end 50 and a lower end 52. The tension lever 48 is pivoted between its ends to about the midpoint of the second link 38. Helical tension spring 54 extends from the lower end 52 of 1 the tension lever 48 to the junction of the first link 36 and third link 40. An adjustment bar 56 extends from the top 50 of the extension lever 48 forward to perforated ear 58 on second link 38. The adjustment bar 56 has a plurality of holes 60 therethrough. As easily seen pin 62 is placed through a selected hole 60 in the adjustment bar forward of perforated ear 58. Therefore, this will hold a predetermined amount of stress upon the spring 54. If more stress is desired, the adjustment bar is pulled forward, and the pin is moved. The tension of the spring 54 will hold the pin firmly against the perforated ear 58.

The opening plow in the form of a disk 30 is journaled base 64 of the forth link 42, of the four link parallel motion linkage The cover wheel 34 is pivoted to an extension of the base 64. The base 64 is rigid with the remainder of the forth link 42. It may be seen that the adjustment bar 56, the perforated ear 58, and the pin 62 form a stress means for fixing the tension lever 48 at a selected angular position to the second link 38 so that the spring 54 exerts a selected stress upon the linkage.

As an aid to correlating the terms of the claims to the exemplary drawing, the following catalog of elements is provided:

10 Main Tool Bar
12 Shanks
14 Beam
16 Seed Box
18 Braces
20 Cylindrical Planter Tool Bar
22 Bearing
24 Lever
26 Hydraulic Cylinder
28 Ear
29 Planting Unit
30 Opening Plow
32 Chute
34 Wheel
36 First Link
38 Second Link
40 Third Link
42 Forth Link
44 "U" Bolts
46 Slab
48 Tension Lever
50 Upper End
52 Lower End
54 Spring
56 Adjustment Bar
58 Perforated Ear
60 Hole
62 Pin
64 Base
66 Tractor
68 Units
120 Square Planter Tool Bar
122 Sleeve
126 Turnbuckle The embodiments shown and described above are only exemplary. I do not claim to have invented all the parts, elements or steps described. Various modifications can be made in the construction, material, arrangement, and operation, and still be within the scope of my invention.

The limits of the invention and the bounds of the patent protection are measured by and defined in the following claims. The restrictive description and drawing of the specific examples above do not point out what an infringement of this patent would be, but are to enable the reader to make and use the invention.

I claim as my invention:
1. A planter for planting land having
   a. a plurality of planting units each including
      i. furrow means for forming a furrow in which to drop the seed,
      ii. a seed chute through which seed may be dropped into the furrow, and
      iii. cover means for covering the seed in the furrow;
   b. a planter tool bar having a longitudinal axis; and
   c. each planting unit connected to the tool bar by a four link parallel motion linkage, including
      i. a first link thereof attached to the tool bar, ii. a fourth link thereof rigidly attached to the planting unit, and
iii. a second and third link thereof connecting the first and fourth link;

wherein the improved structure comprises in combination with the above:

d. a main tool bar,
e. said planter tool bar is journaled to the main tool bar for rotation about its longitudinal axis,
f. an adjustable element extending between
 i. a lever on the planter tool bar, and
 ii. a connection on the main tool bar, forming
g. an adjustment means for positioning and holding the planter tool bar in angular position so that the planting units have the proper angular orientation to the land to be planted;
h. a tension lever having a lower and upper end,
j. the tension lever is pivotally attached between its ends to the second link between the ends of said second link,
k. a helical tension spring extending from the lower end of the tension lever to the connection of the first and third link,
l. an adjustment bar pivoted to the upper end of the tension lever,
m. a perforated ear on the second link above the first link,
n. the adjustment bar extending through the perforated ear,
o. a pin in one of several holes in the adjustment bar at the perforated ear, and
p. the bar, perforated ear, and pin forming stress means for fixing the tension lever in a selected angular position to the second link so that the spring exerts a selected stress upon the linkage.

2. The invention as defined in claim 1 having all the limitations of a. through p. further comprising:
q. clamps means for attaching said first link in adjusted position to the tool bar so that the angular position of each planting unit may be adjusted with respect to the planter tool bar.

3. The invention as defined in claim 1 having all the limitations of a through p. wherein:

q. said adjustment element is in the form of a turnbuckle.

4. The invention as defined in claim 1 having all the limitations of a. through p. wherein:
q. said adjustment element is in the form of a hydraulic cylinder.

5. A planter for planting land having
a. a plurality of planting units each including
 i. furrow means for forming a furrow in which to drop the seed,
 ii. a seed chute through which seed may be dropped into the furrow, and
 iii. cover means for covering the seed in the furrow;
b. a planter tool bar; and
c. each planting unit connected to the tool bar by a four link parallel motion linkage, including
 i. a first link thereof rigidly attached to the tool bar,
 ii. a fourth link thereof rigidly attached to the planting unit, and
 iii. a second and third link thereof connecting the first and fourth link;

wherein the improved structure comprises in combination with the above:

d. a tension lever having a lower and upper end,
e. the tension lever is pivotally attached between its ends to said second link between the ends of the second link,
f. a helical tension spring extending from the lower end of the tension lever to the connection of said first and third link,
g. stress means for fixing the tension lever in a selected angular position to the second link so that the spring exerts a selected stress upon the linkage,
h. an adjustment bar pivoted to the upper end of the tension lever,
j. a perforated ear on the second link above the first link,
k. the adjustment bar extending through the perforated ear, and
l. a pin in one of several holes in the adjustment bar at the perforated ear.

* * * * *